(12) United States Patent
Morihiro et al.

(10) Patent No.: US 7,368,494 B2
(45) Date of Patent: May 6, 2008

(54) EMULSION FOR DAMPING MATERIALS AND CHIPPING-RESISTANT MATERIALS

(75) Inventors: Shigeyasu Morihiro, Osaka (JP); Yukihiro Miyawaki, Kobe (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/272,991

(22) Filed: Oct. 18, 2002

(65) Prior Publication Data

US 2003/0207990 A1    Nov. 6, 2003

(30) Foreign Application Priority Data

Oct. 19, 2001  (JP) .............................. 2001-322185
Nov. 22, 2001  (JP) .............................. 2001-357345

(51) Int. Cl.
    C08K 5/29    (2006.01)
(52) U.S. Cl. ................... 524/196; 428/334; 428/335; 428/339; 524/430; 524/556; 524/832
(58) Field of Classification Search ................ 524/196, 524/430, 556, 832; 428/334, 335, 339
    See application file for complete search history.

(56) References Cited

U.S. PATENT DOCUMENTS

| | | | | |
|---|---|---|---|---|
| 3,919,154 A | * | 11/1975 | Chang et al. ................ | 524/512 |
| 4,062,823 A | * | 12/1977 | Cheung et al. .............. | 524/389 |
| 4,256,809 A | * | 3/1981 | Larsson et al. ............. | 428/473 |
| 4,543,387 A | * | 9/1985 | Padget et al. ................ | 524/523 |
| 4,900,774 A | * | 2/1990 | Mitsuji et al. ............... | 524/512 |
| 5,506,324 A | * | 4/1996 | Gartner et al. ......... | 526/318.41 |
| 5,618,859 A | | 4/1997 | Maeyama et al. | |
| 5,712,339 A | * | 1/1998 | Guerin et al. ................ | 524/515 |
| 5,777,022 A | * | 7/1998 | Bugajski et al. ............. | 524/527 |
| 6,342,558 B1 | * | 1/2002 | Grandhee .................... | 524/457 |
| 6,660,394 B1 | * | 12/2003 | Ishizuki et al. .............. | 428/447 |
| 6,706,800 B2 | * | 3/2004 | Tanno et al. ................ | 524/500 |
| 6,811,665 B2 | * | 11/2004 | Blum et al. ................. | 204/486 |
| 2002/0019480 A1 | * | 2/2002 | Munro et al. ............... | 524/589 |

FOREIGN PATENT DOCUMENTS

| | | |
|---|---|---|
| DE | 4406624 A1 | 9/1995 |
| EP | 0698644 A1 | 2/1996 |
| JP | SHO-61-120818 | 6/1986 |
| JP | SHO-62-11543 | 1/1987 |
| JP | HEI-1-245075 | 9/1989 |
| JP | HEI-2-150445 | 6/1990 |
| JP | HEI 4-202262 | 7/1992 |
| JP | HEI-05-295186 | 11/1993 |
| JP | HEI 6-65525 | 3/1994 |
| JP | HEI-06-145454 | 5/1994 |
| JP | HEI-6-299000 | 10/1994 |
| JP | 07292318 | * 11/1995 |
| JP | 9-104842 | 4/1997 |
| JP | HEI-10-204370 | 8/1998 |
| JP | 11-29737 | 2/1999 |
| JP | HEI 11-263894 | 9/1999 |
| JP | 2000-178497 | 6/2000 |
| JP | 2000-178498 | 6/2000 |
| JP | 2000-178499 | 6/2000 |
| JP | 2000-351815 | 12/2000 |
| JP | 3296580 | 4/2002 |
| JP | 2003-042223 | 2/2003 |
| JP | 2003-155391 | 5/2003 |
| WO | WO 95/00565 A1 | 1/1995 |

OTHER PUBLICATIONS

Machine Translation of JP 07292318 A (1995).*

* cited by examiner

*Primary Examiner*—Bernard Lipman
(74) *Attorney, Agent, or Firm*—Sughrue Mion, PLLC

(57) ABSTRACT

The present invention provides an emulsion composition for vibration damping materials which is capable of giving water-based vibration damping materials exhibiting very satisfactory thermal drying characteristics and vibration damping properties through improved dispersibility and stability and an emulsion composition for chipping-resistant materials which is capable of giving water-based chipping-resistant materials exhibiting satisfactory thermal drying characteristics and chipping-resistant properties. It also is directed to an emulsion composition for vibration damping materials which comprises an emulsion obtained by polymerizing a monomer composition containing an unsaturated carboxylic acid monomer as an essential component and a crosslinking agent. It further is directed to an emulsion composition for vibration damping materials or chipping-resistant materials which comprises an emulsion obtained by polymerizing a monomer composition containing an unsaturated monomer having two or more functional groups as an essential component.

7 Claims, No Drawings

EMULSION FOR DAMPING MATERIALS AND CHIPPING-RESISTANT MATERIALS

FIELD OF THE INVENTION

The present invention relates to an emulsion composition for vibration damping materials and an emulsion for chipping-resistant materials. More particularly, the present invention relates to an emulsion composition for vibration damping materials which can be used with advantage as an ingredient in damper formulations (vibration damping formulations) and an emulsion composition for chipping-resistant materials which can be used with advantage as an ingredient in chipping-resistant formulations.

DESCRIPTION OF THE RELATED ART

Vibration damping materials are used to prevent vibration and noise of various structures to insure sustained quietude and have been used not only beneath the cabin floors of road vehicles but also applied to rolling stock, ships, aircraft, electric machines, buildings, and construction machines, among other uses. As such vibration damping materials, an inorganic powder-containing asphalt sheet has been installed under automotive cabin flooring, for instance, but since the sheet must be secured in position by thermal fusion, improvements in workability and other parameters are needed and studies are underway on various damper compositions and polymers for the formation of vibration damping materials.

Japanese Kokai Publication Hei-9-104842 discloses a water-based vibration damper paint composition comprising at least one vehicle selected from the group consisting of synthetic resin emulsions and asphalt emulsions, an inorganic filler, and a synthetic resin powder in a certain ratio.

Japanese Kokai Publication Hei-11-29737 discloses a copolymer latex for water-based paints which is obtainable by copolymerizing (a) an aliphatic conjugated diene monomer, (b) an ethylenically unsaturated carboxylic acid monomer, and (c) a monomer other than the above-mentioned monomers in a certain weight ratio in the presence of α-methylstyrene dimer and having certain specified loss factor (tan δ) and toluene-insoluble fraction values.

Japanese Kokai Publication 2000-178497 discloses a copolymer latex for chipping-resistant paint which is obtainable by emulsion-polymerizing a monomer mixture comprising a conjugated diene monomer (a), an ethylenically unsaturated carboxylic acid amide monomer (b), an ethylenically unsaturated carboxylic acid monomer (c) and a monomer other than the above-mentioned ethylenically unsaturated monomers (d) in a certain weight ratio in the presence of an inorganic persulfate polymerization initiator. Further, Japanese Kokai Publication 2000-178498 discloses a copolymer latex for vibration damping materials which is obtainable by emulsion-polymerizing a conjugated diene monomer (a), an epoxy group-containing ethylenically unsaturated monomer (b), an ethylenically unsaturated carboxylic acid alkyl ester monomer (c), and an ethylenically unsaturated monomer other than said (b) and (c) monomers (d) in a certain weight ratio. In addition, Japanese Kokai Publication 2000-178499 discloses a copolymer latex for vibration damping materials which is obtainable by emulsion-polymerizing a monomer composition comprising a conjugated diene monomer (a), an epoxy group-containing ethylenically unsaturated monomer (b), an ethylenically unsaturated carboxylic amide monomer (c), and an ethylenically unsaturated monomer other than said (b) and (c) monomers (d) in a certain weight ratio.

By any of these technologies, however, it is impossible to obtain a vibration damping material which satisfies both thermal drying characteristics and vibration damping properties sufficiently. Thus, when a synthetic resin emulsion or an asphalt emulsion is used and a coating film is formed by thermal drying, blisters tend to form as the vaporized moisture in the undried interior of the coating is forced out through the dried surface so that it is necessary to provide some measure for improving the thermal drying characteristics. When a copolymer latex comprising a conjugated diene monomer and other monomers is used, the conjugated diene monomer unit is not so contributory to the expression of vibration damping properties so that there is room for a contrivance to reconcile satisfactory thermal drying characteristics and satisfactory vibration damping properties.

SUMMARY OF THE INVENTION

Developed in the light of the above state of the art, the present invention has for its object to provide an emulsion composition for vibration damping materials which is capable of giving water-based vibration damping materials exhibiting very satisfactory thermal drying characteristics and vibration damping properties through improved dispersibility and stability and an emulsion composition for chipping-resistant materials which is capable of giving water-based chipping-resistant materials exhibiting satisfactory thermal drying characteristics and chipping-resistant properties.

The inventors of the present invention performed an exploratory assessment of various raw materials to be used in many different damper formulations and had their attention directed first to the fact that emulsions giving water-based vibration damping materials are superior in workability and other respects. They discovered that not only thermal drying characteristics but also vibration damping properties can be improved by using an emulsion obtained by polymerizing a monomer composition comprising an unsaturated carboxylic acid monomer as an essential component in combination with a crosslinking agent which is capable of effecting interparticle crosslinking of the emulsion. They further found that by using an unsaturated monomer having two or more functional groups as an essential component of an emulsion-forming monomer composition to give an internally crosslinked emulsion, improvements can be obtained not only in thermal drying characteristics but also in vibration damping properties of the emulsion. It was also discovered that said interparticle crosslinking optimizes the emulsion composition for vibration damping materials and that said internal crosslinking renders the emulsion suitable not only for vibration damping materials but also for chipping-resistant materials. They accordingly conceived of the possibility of accomplishing the above object in a neat way. Thus, in the vibration damping material formed from a damper formulation containing the emulsion composition for vibration damping materials of the present invention, improvements in the prevention of vibrations and noise of various structures and consequent maintenance of quietude are attained through the interparticle crosslinking and internal crosslinking of the emulsion as mentioned above, and this effect seems to be derived from, inter alia, the constitution of a vibration damping material formed from said emulsion, which is preferable as the emulsion composition for vibration damping materials, or the constitution of a chipping-resistant material formed from said emulsion, which is preferable as the emulsion composition for chipping-resistant materials. It was further found that when the glass transition temperature (Tg) of the emulsion is controlled within a certain range and/or the emulsion is formed from a monomer composition containing an ethylenically unsaturated carboxylic acid monomer and at least one other ethylenically unsaturated monomer in a certain mass ratio, very satisfactory thermal drying characteristics and vibration damping properties can be imparted to water-based vibration damping materials with improved reproducibility or very satisfactory thermal drying characteristics and chipping-resistant properties can be imparted to water-based chipping-resistant materials. The inventors accordingly have developed the present invention.

As further findings, it was discovered that when a metal oxide is included in a damper formulation or a chipping-resistant formulation, there can be obtained a water-based vibration damping material capable of expressing good thermal drying characteristics and vibration damping properties or a water-based chipping-resistant material expressing good thermal drying characteristics and chipping-resistant properties. In was also discovered that as said metal oxide, a polyvalent metal oxide is preferred, with zinc oxide or zirconium oxide being particularly preferred.

The present invention, therefore, is directed to an emulsion composition for vibration damping materials which comprises an emulsion obtained by polymerizing a monomer composition containing an unsaturated carboxylic acid monomer as an essential component and a crosslinking agent.

The present invention is further directed to an emulsion composition for vibration damping materials or chipping-resistant materials which comprises an emulsion obtained by polymerizing a monomer composition containing an unsaturated monomer having two or more functional groups as an essential component.

DETAILED DESCRIPTION OF THE INVENTION

The present invention is now described in detail. The emulsion composition for vibration damping materials of the present invention can be provided in a form (1) comprising an emulsion obtained by polymerizing a monomer composition containing an unsaturated carboxylic acid monomer as an essential component and a crosslinking agent or a form (2) comprising an emulsion obtained by polymerizing a monomer composition containing an unsaturated monomer having two or more functional groups as an essential component. These forms may be used in a suitable combination.

In the above emulsion composition for vibration damping materials (1), the inclusion of a crosslinking agent together with the emulsion as another essential component leads to improvements in the thermal drying characteristics of the emulsion composition for vibration damping materials and in the vibration damping properties of the vibration damping material formed from a damper formulation containing such emulsion composition for vibration damping materials as an essential ingredient.

The crosslinking agent mentioned above may be any compound that is capable of reacting with two or more carboxyl groups and may be a single compound or a combination of two or more different compounds. The preferred crosslinking agent is at least one member selected from the group consisting of metal oxides, isocyanate compounds, blocked isocyanate compounds, melamine compounds, epoxy compounds, oxazoline compounds and vinyl ether compounds. Among these, metal oxides are particularly preferred and polyvalent metal oxides are most preferred.

As the polyvalent metal oxides referred to above, the preferred species are zinc oxide, zinc chloride, zinc sulfate, and zirconium oxide. Among these, zinc oxide is preferably used as an essential ingredient, and the formulation of zinc oxide contributes to a more definite expression of the effect of the present invention leading to improved thermal drying characteristics and improved vibration damping properties. The level of use of zinc oxide is preferably 0.1 to 20 weight parts based on 100 weight parts of the emulsion solids. Thus, the preferred amount of zinc oxide in the emulsion composition for vibration damping materials based on 100 weight parts of the total emulsion solids is 0.1 to 20 weight parts, more preferably 0.1 to 15 weight parts, and still more preferably over 3 weight parts but not over 15 weight parts. It is also good practice to formulate zirconium oxide as an essential component of the formulation, for it contributes to a further improvement in the stability of the emulsion composition for vibration damping materials. The level of use of zirconium oxide based on 100 weight parts of the total emulsion solids is 0.1 to 20 weight parts. The more preferred level is 0.1 to 15 weight parts and the still more preferred level is over 1 weight part but not over 15 weight parts.

The crosslinking agent can be used in a powdery form or in the form of an aqueous dispersion. Between these alternative forms, the use of an aqueous dispersion leads to better dispersiblity of the crosslinking agent in a damper formulation comprising said emulsion composition for vibration damping materials as an essential ingredient as well as improved long-term storage stability of the formulation. Therefore, it is preferably used as dispersed in water with the aid of an emulsifier. When the crosslinking agent is used in the form of such an emulsified aqueous dispersion, it is well dispersible in the emulsion so that the effect attributable to the combination of the emulsion and the crosslinking agent is sufficiently expressed. As a result, the stability and dispersibility of a damper formulation containing the emulsion composition for vibration damping materials of the present invention as an essential ingredient are enhanced so that not only thermal drying characteristics but also vibration damping properties are improved.

In the second-mentioned emulsion composition for vibration damping materials or emulsion composition for chipping-resistant materials (2), the monomer composition contains an unsaturated monomer having two or more functional groups as an essential component. While the emulsion composition for vibration damping materials or emulsion composition for chipping-resistant materials containing such a monomer as an essential component is useful for both vibration-damping materials and chipping-resistant materials, it is particularly suited to the vibration damping materials.

The functional groups of said unsaturated monomer having two or more functional groups may be any groups that are capable of crosslinking during production of the emulsion by copolymerization. By virtue of such functional groups, the emulsion composition for vibration damping materials and the emulsion composition for chipping-resistant materials are improved in film-forming properties and thermal drying characteristics. In the present invention, because the monomer composition mentioned above contains an unsaturated monomer having two or more functional groups as an essential component, the effect attributable to this unsaturated monomer having functional groups is fully expressed. Moreover, the monomer composition may or may not additionally contain an unsaturated monomer having only one functional group.

The preferred functional group includes epoxy, oxazoline, carbodiimide, aziridinyl, isocyanato, methylol, vinyl ether, cyclocarbonate, and alkoxysilane groups. Only one or a plurality of species of these functional groups may occur in each molecule of the unsaturated monomer.

The preferred species of said unsaturated monomer having two or more functional groups includes the following polyfunctional unsaturated monomers: divinylbenzene, ethylene glycol di(meth)acrylate, N-methoxymethyl(meth)acrylamide, N-methxoyethyl(meth)acrylamide, N-n-butoxymethyl(meth)acrylamide, N-i-butoxymethyl(meth)acrylamide, N-methylol(meth)acrylamide, diallyl phthalate, diallyl terephthalate, polyethylene glycol di(meth)acrylate, propylene glycol di(meth)acrylate, polypropylene glycol di(meth)acrylate, tetramethylene glycol di(meth)acrylate, polytetramethylene glycol di(meth)acrylate, 1,6-hexanediol di(meth)acrylate, neopentyl glycol di(meth)acrylate, and so on. Among these, unsaturated monomers having three or more functional groups are advantageous in that the effect of the present invention is more fully expressed. As regards said unsaturated monomer having only one functional group, glycidyl group-containing unsaturated monomers such as glycidyl(meth)acrylate and acryloyl glycidyl ether are preferred. These can be used each independently or in a combination of two or more species.

The emulsion according to the present invention is a water-based system consisting of water as a continuous phase, where a polymer formed from an unsaturated carboxylic acid monomer as an essential monomer and/or a polymer formed from an unsaturated monomer having two or more functional groups as an essential monomer is dispersed. Usually, a substrate is coated with such a damper formulation comprising said emulsion composition for vibration damping materials as an essential ingredient to provide a vibration damping material or with a chipping-resistant formulation comprising said emulsion composition for chipping-resistant materials as an essential ingredient to provide a chipping-resistant material. The vibration damping material and the chipping-resistant material formed from an emulsion will hereinafter be referred to sometimes as a water-based vibration damping material and a water-based chipping-resistant material, respectively.

The monomer composition which is to form the emulsion according to the present invention comprises an unsaturated carboxylic acid monomer and/or an unsaturated monomer having two or more functional groups as an essential component and may optionally contain other monomers copolymerizable with said unsaturated carboxylic acid monomer and unsaturated monomer having two or more functional groups substantially without restriction unless the expression of the effect of the present invention is thereby undermined. The preferred emulsion contains said unsaturated carboxylic acid monomer and/or unsaturated monomer having two or more functional groups and one or more other monomers copolymerizable with the above essential monomers. It is also preferable that, in the emulsion of the present invention, said monomers have been "copolymerized".

The unsaturated carboxylic acid monomer referred to above is not particularly restricted insofar as it is a compound having an unsaturated bond and a carboxyl group within the molecule. However, it is preferable to use an ethylenically unsaturated carboxylic acid monomer. Thus, one of the preferred embodiments of the present invention is an emulsion composition for vibration damping materials or an emulsion composition for chipping-resistant materials, which comprises an emulsion prepared by polymerizing a monomer composition containing an ethylenically unsaturated carboxylic acid monomer as an essential component.

In the present invention, it is also preferable that the monomer composition contains an acrylic monomer as an essential component. The acrylic monomer which can be used includes (meth)acrylic acid and (meth)acrylic acid derivatives such as (meth)acrylic acid esters.

The proportion of such acrylic monomer or monomers in the monomer composition is preferably not less than 50 mass % of the total monomer composition. From the standpoint of vibration damping properties and chipping-resistant properties, the conjugated diene monomer content of such a monomer composition is preferably not more than 10 mass % of the total monomer composition, more preferably not more than 5 mass %. It is most preferably that the monomer composition does not contain any conjugated diene monomer.

In the present invention, said monomer composition is preferably a composition in which said unsaturated monomer having two or more functional groups accounts for less than 10 mass %, preferably 0.1 to 3.0 mass %, of the total monomer composition.

The above mass percentage figures are based on 100 mass % of the total monomer composition.

Furthermore, in the present invention, said monomer composition is preferably composed of 0.1 to 20 mass % of an ethylenically unsaturated carboxylic acid monomer and 99.9 to 80 mass % of other copolymerizable ethylenically unsaturated monomer. On account of the inclusion of an ethylenically unsaturated carboxylic acid monomer, the dispersibility of a filler, such as an inorganic powder, in the damper formulation or chipping-resistant formulation containing said emulsion composition for vibration damping materials or emulsion composition for chipping-resistant materials as an essential ingredient is improved to enhance vibration damping properties or chipping-resistant properties. Furthermore, by formulating said other copolymerizable ethylenically unsaturated monomer, it is made easier to adjust the Tg and other physical properties of the emulsion composition for vibration damping materials or the emulsion composition for chipping-resistant materials. If the proportion of the ethylenically unsaturated carboxylic acid monomer in said monomer composition is either less than 0.1 mass % or exceeds 20 mass %, no stable copolymerization of the emulsion may be achieved.

In the emulsion composition for vibration damping materials or the emulsion composition for chipping-resistant materials, the synergism of effects of the monomer units derived from such monomers insures sufficient expression of good thermal drying characteristics and vibration damping properties in the production of a water-based vibration damping material or good thermal drying characteristics and chipping-resistant properties in the production of a water-based chipping-resistant material.

The mass percentage figures mentioned above are based on 100 mass % of the total monomer composition.

As the ethylenically unsaturated carboxylic acid monomer referred to above, it is preferable to use one or more members selected from the group consisting of unsaturated carboxylic acids and derivatives thereof, such as (meth)acrylic acid, crotonic acid, itaconic acid, fumaric acid, maleic acid, monomethyl fumarate, monoethyl fumarate, monomethyl maleate, monoethyl maleate and so on.

As said other copolymerizable ethylenically unsaturated monomer or monomers, it is preferable to use one or more species of the functional group-containing unsaturated monomers mentioned above; (meth)acrylic acid esters such as methyl (meth)acrylate, ethyl (meth)acrylate, butyl (meth)acrylate, 2-ethylhexyl (meth)acrylate, cyclohexyl (meth)acrylate, etc.; and aromatic unsaturated monomers such as styrene.

When the number average molecular weight of said emulsion is small, the mutual affinity of the filler, e.g. an inorganic powder, and the emulsion is enhanced to improve dispersibility in the damper formulation or chipping-resistant formulation containing the emulsion composition for vibration damping materials or the emulsion composition for chipping-resistant materials of the present invention which contains the emulsion as an essential ingredient.

The emulsion according to the present invention preferably has a glass transition temperature (Tg) of −50° C. to 40° C. If it is below −50° C. or over 40° C., sufficient vibration damping or chipping-resistant effects may not be expressed. The more preferred Tg range is −10 to 35° C. The Tg of an emulsion can be calculated from the Tg values of homopolymers of the respective monomers constituting the emulsion.

The emulsion according to the present invention preferably has a gel fraction of 0 to 45 mass % as determined in the solvent toluene. The gel fraction in the context of the present invention is an index representing the solubility of the film formed from the emulsion in the solvent toluene, and the higher the gel fraction value is, the lower is the solubility in the solvent toluene. The gel fraction reflects the molecular structure of a resin and if the gel fraction of the emulsion exceeds 45 mass %, vibration damping properties or chipping-resistant properties may not be fully expressed when the emulsion is used in a damper formulation or a chipping-resistant formulation. Moreover, the temperature dependency of vibration damping properties or chipping-resistant properties is increased so that, for example, a peak of damping effect or a peak of chipping-resistant effect will appear in a limited temperature region. In order to insure expression of good vibration damping properties or chipping-resistant properties, the gel fraction of the emulsion is preferably controlled within the range of 5 to 45 mass %, more preferably 0 to 30 mass %.

The gel fraction referred to above is preferably determined by a method of quantitating toluene-insolubles, for example as described below.

<Method for Determination of the Gel Fraction (Toluene-Insolubles)>

The emulsion is cast into a 0.2 cm-deep frame on a sheet of releasing paper to mold a 0.2 cm-thick film. This film was cut to 2 cm (L)×2 cm (W)×0.2 cm (T) to prepare a test film. This test film was immersed in 100 ml of toluene and agitated for 6 hours using a magnetic stirrer at room temperature. The mixture was then filtered through a 100-mesh metal sieve and the solid matter of the filtrate is quantitated to calculate the gel fraction.

The emulsion mentioned above is preferably such that when it is formulated into a damper formulation as described above, the loss factor (loss tangent: tan δ) of the damper formulation will be not less than 0.15. Thus, when the emulsion according to the present invention is formulated into a damper formulation described below, the loss factor (tan δ) of the film formed from the damper formulation is preferably not less than 0.15. The vibration damping properties, that is loss factor, of the film is correlated with the tan δ of the film used, and the higher the tan δ value of the film is, the higher is the vibration damping properties of the film.

If said loss factor (tan δ) is less than 0.15, acceptable vibration damping properties may not be expressed in a water-based vibration damping material. The loss factor is more preferably not less than 0.16, still more preferably not less than 0.18.

<Composition of the Damper Formulation>
Emulsion 100 weight parts
Calcium carbonate: NN#200 (trademark, product of Nitto Powder Industry Co.) 250 weight parts
Dispersant: Demol EP (trademark, product of Kao Corporation) 1 weight part
Thickener: Acryset WR-600 (trademark, Nippon Shokubai Co.) 2 weight parts
Antifoaming agent: Nopco 8034L (trademark, product of Sun Nopco Co.) 0.3 weight part <Method for Determination of Loss Factor (tan δ)>

The above damper formulation was poured into a 3 mm-deep frame on a cationically electrocoated steel panel (15 mm (W)×250 mm (L)×0.8 mm (T)) and dried at 150° C. for 30 minutes to prepare a testpiece. Using Ono Instrument's loss factor determination system and a cantilever method, the loss factor of the testpiece in a 25° C. measuring environment was determined.

The process for producing the above emulsion is described below.

The above emulsion is prepared by polymerizing a monomer composition comprising an unsaturated carboxylic acid monomer and/or an unsaturated monomer having two or more functional groups as an essential component. The emulsion polymerization method can be used advantageously for polymerizing the monomer composition. The mode of emulsion polymerization may comprise adding the monomer composition, a polymerization initiator and a surfactant to an aqueous medium judiciously and conducting the polymerization reaction. For molecular weight adjustment, a chain transfer agent may be employed.

The aqueous medium mentioned above is preferably water, a mixture solvent composed of one or more water-miscible solvents, or a mixture solvent consisting of such a solvent and a predominant proportion of water. Among these, water is preferred.

As the polymerization initiator mentioned above, the known water-soluble or oil-soluble initiator, such as ammonium persulfate, potassium persulfate, hydrogen peroxide, butyl hydroperoxide or the like, can be used with advantage. To accelerate the emulsion polymerization, a redox initiator system may be formed by adding sodium hydrogensulfite or L-ascorbic acid as a reducing agent. These may be used each independently or in a combination of two or more species.

The level of use of said polymerization initiator may be judiciously selected according to the kind of initiator but, based on 100 weight parts of the total monomer composition, is preferably 0.1 to 2 weight parts, more preferably 0.2 to 1 weight part.

The surfactant mentioned above may be any of anionic, nonionic, and nonionic-anionic emulsifiers. In terms of the stability of emulsion polymerization, nonionic emulsifiers and nonionic-anionic emulsifiers are preferred among them, and more preferably a nonionic emulsifier and a nonionic-anionic emulsifier are used together. The anionic emulsifier includes fatty acid soaps, rosin soaps, alkylsulfonic acid soaps, dialkylarylsulfonate, alkylsulfosuccinate, and polyoxyethylene-alkylsulfate, among others. The nonionic emulsifier includes polyoxyethylene alkyl ethers, polyoxyethylene alkylaryl ethers, polyoxyethylene sorbitan fatty acid esters, and oxyethylene-oxypropylene block copolymers, among others. These surfactants can be used each independently or in a combination of two or more species.

The level of use of such surfactant can be judiciously selected according to the kind of surfactant, among other factors, but based on 100 weight parts of the total monomer composition, is preferably 0.05 to 5.0 weight parts, more preferably 0.1 to 3 weight parts.

The polymerization chain transfer agent includes alkylmercaptans, e.g. hexylmercaptan, octylmercaptan, n-dodecylmercaptan, t-dodecylmercaptan, n-hexadecylmercaptan, n-tetradecylmercaptan, etc.; halogenated hydrocarbons, e.g. carbon tetrachloride, carbon tetrabromide, ethylene bromide, etc.; mercaptocarboxylic acid alkyl esters, e.g. 2-ethylhexyl mercaptoacetate, 2-ethylhexyl mercaptopropionate, tridecyl mercaptopropionate, etc.; mercaptocarboxylic acid alkoxyalkyl esters, e.g. methoxybutyl mercaptoacetate, methoxybutyl mercaptopropionate, etc.; carboxylic acid mercaptoalkyl esters, e.g. 2-mercaptoethyl octanoate etc.; α-methylstyrene dimer, terpinolene, α-terpinene, γ-terpinene, dipentene, anisole, and allyl alcohol, to mention some preferred examples. These can be used each independently or in a combination of two or more species. Among these, it is preferable to use an alkylmercaptan such as hexylmercaptan, octylmercaptan, n-dodecylmercaptan, t-dodecylmercaptan, n-hexadecylmercaptan, n-tetradecylmercatan or the like. The level of use of the polymerizaitn chain transfer agent based-on 100 weight parts of the total monomer composition is generally 0 to 1 weight part, preferably 0 to 0.5 weight part.

The above emulsion polymerization may be carried out in the presence of a chelating agent such as sodium ethylenediaminetetracetate, a dispersant such as poly(sodium acrylate), and/or an inorganic salt. As to the mode of addition of the monomers, polymerization initiator, etc., any of en bloc addition, continuous addition, multistage addition, etc. may be employed. These modes of addition may be used in a suitable combination.

Regarding the reaction conditions to be used for said emulsion polymerization, the optimum conditions can be selected according to the monomer formulation, the kind of polymerization initiator, and other factors. The polymerization temperature is preferably 5 to 90° C., more preferably 20 to 85° C. The preferred polymerization time is 3 to 8 hours. The polymerization and dropwise additions are preferably carried out under stirring.

In the above process, the emulsion prepared by emulsion polymerization as above is preferably neutralized with a neutralizing agent, whereby the emulsion is stabilized. The neutralizing agent which can be employed includes tertiary amines, such as triethanolamine, dimethylethanolamine, diethylethanolamine, morpholine, etc.; aqueous ammonia; sodium hydroxide; and so forth. These can be used each independently or in a combination of two or more species. Among these, volatile bases which will be evaporated off on heating in the thermal drying of the film are preferred because these are conducive to an enhancement in the water resistance of the film formed from a damper formulation or chipping-resistant formulation containing said emulsion as an essential ingredient. More preferably, it is advantageous to use an amine whose boiling point at 80 to 360° C., for it contributes to improved thermal drying characteristics and improved vibration damping properties or chipping-resistant properties. Thus, as the neutralizing agent, a tertiary amine such as triethanolamine, dimethylethanolamine, diethylethanolamine, morpholine or the like is preferred. More preferably, an amine whose boiling point at 130 to 280° C. is employed.

The boiling point referred to above is the boiling point at atmospheric pressure.

The preferred level of addition of said neutralizing agent is 0.6 to 1.4 equivalents relative to the acid value of the emulsion, namely to 1 equivalent of the acid radical in the emulsion. The more preferred level is 0.8 to 1.2 equivalents.

The emulsion composition for vibration damping materials or the emulsion composition for chipping-resistant materials as provided by the present invention can be formulated with various additives and a solvent to constitute a damper formulation or a chipping-resistant formulation. Such a vibraiton damping formulation or a chipping-resistant formulation containing the above-described emulsion composition for vibration damping materials or emulsion composition for chipping-resistant materials of the present invention as an essential ingredient constitute another preferred embodiment of the present invention, and each is capable of expressing excellent thermal drying characteristics as well as good vibration damping properties or chipping-resistant properties to form a water-based vibration damping material or a water-based chipping-resistant material.

The formulating level of said emulsion composition for vibration damping materials in the above damper formulation is preferably that solids of the emulsion composition for vibration damping materials, relative to 100 mass % solids of the total damper formulation, is 30 to 60 mass %. The concentration of solids in the damper formulation as such is preferably 10 to 40 mass % based on 100 mass % of the damper formulation.

As said additives, there can be mentioned the filler, colorant, aseptic, dispersant, thickener, thioxtropic agent, antifreezing agent, pH control agent, antifoam, wetting agent, rust inhibitor, and adhesive mass, among others. These may be used each alone or in a combination of two or more species. Among these, the filler is preferably formulated.

The filler mentioned above includes inorganic fillers such as calcium carbonate, kaolin, silica, talc, barium sulfate, alumina, iron oxide, titanium oxide, glass powder, etc.; flaky inorganic fillers such as glass flakes, mica, etc.; and filamentous inorganic fillers such as metal oxide whiskers, glass fibers and so forth.

The formulating level of said filler is preferably 50 to 400 weight parts based on 100 weight parts of emulsion solids. The more preferred level is 100 to 350 weight parts on the same basis.

The solvent mentioned above is not particularly restricted provided that the operation and effect of the present invention can be insured, and one or more solvent species can be employed. The formulating level of the solvent may, for example, be so selected that the concentration of solids in the damper formulation will fall within the above-mentioned range.

The equipment that can be used for the production of the above damper formulation includes the butterfly mixer, planetary mixer, spiral mixer, kneader, Dissolver and so on.

The above damper formulation, when it contains the second-mentioned emulsion composition for vibration damping materials (2), too, preferably contains a polyvalent metal oxide together with said emulsion composition for vibration damping materials. By formulating the metal oxide, the stability, dispersibility, and thermal drying characteristics of the damper formulation and the vibration damping properties of the vibration damping material formed from the damper formulation can be improved. The preferred species and form of the polyvalent metal oxide are the same as those mentioned hereinbefore.

In the present invention, by incorporating the polyvalent metal oxide in the damper formulation, the thermal drying properties of the compound constituting the damper formulation can be improved and the vibration damping properties of the vibration damping material formed from such a damper formulation containing a polyvalent metal oxide as an essential component is improved. The polyvalent metal oxide thus contained in the damper formulation constitutes one of the preferred embodiments of the present invention.

Regarding said polyvalent metal oxide, one or more species can be employed and the preferred form is the same as described hereinbefore. The preferred ingredient to be formulated into the damper formulation along with said polyvalent metal oxide, that is to say the other ingredient to constitute the damper formulation, is the emulsion described above.

The formulating level of the emulsion composition for chipping-resistant materials in the chipping-resistant formulation which is to form said chipping-resistant material is preferably 30 to 60 mass % in terms of emulsion solids based on 100 mass % of the total solids of the chipping-resistant formulation. The concentration of solids in the chipping-resistant formulation is preferably 10 to 40 mass % based on 100 mass % of the chipping-resistant formulation.

The additives may be the same as those mentioned hereinbefore and it is preferable that a filler is formulated. The formulating level of the filler in the chipping-resistant formulation is preferably 50 to 400 weight parts, more preferably 100 to 350 weight parts, based on 100 weight parts of the solids of the emulsion composition for chipping-resistant materials.

The above chipping-resistant formulation, too, preferably contains a polyvalent metal oxide along with said emulsion composition for chipping-resistant materials. By formulating a polyvalent metal oxide, the stability, dispersibility and thermal drying characteristics of the chipping-resistant formulation and the chipping-resistant properties of the chipping-resistant material formed from said chipping-resistant formulation can be improved. The polyvalent metal oxide includes the same compounds as mentioned hereinbefore and, among them, zinc oxide and zirconium oxide are preferred. The form of said polyvalent metal oxide may also be the same as that described above and in view of better dispersibility of ingredients in the chipping-resistant formulation, the metal oxide is preferably used in the form of an aqueous dispersion or an emulsified dispersion. The more preferred is an emulsified dispersion. The level of use of the polyvalent metal oxide is preferably 0.05 to 5.0 weight parts based on 100 weight parts of the solids in the emulsion composition for chipping-resistant materials. The more preferred level is 0.05 to 3.5 weight parts.

The solvent mentioned above is not particularly restricted insofar as the operation and effect of the present invention are not compromised, and one or more solvent species can be employed. The formulating amount of the solvent can be selected so that the concentration of solids in the chipping-resistant formulation will fall within the above-mentioned range.

The method of producing said emulsion composition for vibration damping materials or emulsion composition for chipping-resistant materials of the present invention, which is to be used for the production of a damper formulation containing the first-mentioned emulsion composition for vibration damping materials (1) as an essential ingredient, need only be such that the resulting damper formulation will contain the essential ingredients of the emulsion composition for vibration damping materials of the present invention, namely said emulsion and crosslinking agent. The preferred specific technology includes (a) the method which comprises preparing an emulsion composition for vibration damping materials in the form of a premix with a crosslinking agent and admixing the premix with said various additives, solvent, etc. to give a damper formulation containing said emulsion composition for vibration damping materials as an essential ingredient and (b) the method in which, without premixing said emulsion with the crosslinking agent, the additives, solvent and others are mixed with the essential ingredients as necessary to produce a damper formulation containing said emulsion composition for vibration damping materials as an essential ingredients. In these methods, the order of additions is not particularly restricted.

The damper formulation or chipping-resistant formulation containing the second-mentioned emulsion composition for vibration damping materials or emulsion composition for chipping-resistant materials (2) as an essential ingredient can be produced by admixing said emulsion composition for vibration damping materials or emulsion composition for chipping-resistant materials with said additives, solvent and others.

The preferred equipment for use in the production of said damper formulation or chipping-resistant formulation includes the butterfly mixer, planetary mixer, spiral mixer, kneader and Dissolver, among others.

The above damper formulation exhibits excellent thermal drying characteristics and vibration damping properties and forms a water-based vibration damping material. The above chipping-resistant formulation exhibits very satisfactory thermal drying characteristics and chipping-resistant properties and forms a water-based chipping-resistant material. The vibration damping material formed from the damper formulation containing the emulsion composition for vibration damping materials of the present invention as an essential ingredient and the chipping-resistant material formed from the chipping-resistant formulation containing the emulsion composition for chipping-resistant materials of the present invention as an essential ingredient constitute a further preferred embodiment of the present invention.

The above damper formulation or chipping-resistant formulation is coated on a substrate and dried to give a film constituting said vibration damping material or chipping-resistant material. The substrate is not particularly restricted. As regards the method of coating a substrate with said damper formulation or chipping-resistant formulation, the brush, spatula, air spray gun, airless spray gun, mortar gun, texture gun, etc. can be used for coating.

The coating amount of the above damper formulation or chipping-resistant formulation may be selected according to the intended application and expected performance, among other variables. In the case where the vibration damping material is to be formed by using the damper formulation as a coating, for instance, the dry thickness of the coating is preferably 0.5 to 5.0 mm, more preferably 1.5 to 4.5 mm. In the case where the chipping-resistant material is to be formed by using the chipping-resistant formulation as a coating, for instance, the dry thickness of the coating is preferably 0.5 to 5.0 mm, more preferably 1.5 to 4.5 mm.

Regarding the conditions to be used in the case where said damper formulation or chipping-resistant formulation is coated on a substrate and dried to form a film, either drying by heating or drying at atmospheric temperature can be adopted. However, from efficiency points of view, drying by heating is preferred. This is especially true because the formulations according to the present invention have excellent thermal drying characteristics. The temperature of said drying by heating for the formation of a vibration damping material is preferably 80 to 210° C., more preferably 110 to 160° C. For the formation of a chipping-resistant material, too, the drying temperature is preferably 80 to 210° C., more preferably 110 to 160° C.

Since the damper formulation containing the emulsion composition for vibration damping materials of the present invention as an essential ingredient exhibits excellent thermal drying characteristics and vibration damping properties, it can be used with great advantage in such applications as automotive cabin floor base, rolling stock, ships, aircraft, electric machinery, buildings and construction machinery, among others. The chipping-resistant formulation containing the emulsion composition for chipping-resistant materials of the present invention as an essential ingredient exhibits excellent thermal drying characteristics and chipping-resistant properties and, therefore, can be applied with great advantage to automotive exteriors, automotive parts, household electrical appliances and machines, among others.

The emulsion composition for vibration damping materials and emulsion composition for chipping-resistant materials of the present invention, each constituted as above, can be used with great advantage as ingredients in damper formulations and chipping-resistant formulations, respectively. Moreover, the damper formulation containing such emulsion composition for vibration damping materials as an essential ingredient exhibits excellent thermal drying characteristics and vibration damping properties and forms water-based vibration damping materials, thus finding application in such fields of use as automotive cabin floor base, rolling stock, ships, aircraft, electric machinery, buildings and construction machinery, among other uses. Further, the chipping-resistant formulation containing the emulsion composition for chipping-resistant materials of the present invention as an essential ingredient exhibit excellent thermal drying characteristics and chipping-resistant properties and forms water-based chipping-resistant materials so that these can be used with great advantage in a variety of fields such as automotive exteriors, automotive parts, household electrical appliances, and machines, among others.

BEST MODE FOR CARRYING OUT THE INVENTION EXAMPLES

The following examples illustrate the present invention in further detail without defining the scope of the invention. It should be understood that unless otherwise indicated, all "parts" are "weight parts" and "%" means "mass %".

Example 1

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 245.0 parts of styrene, 189.2 parts of 2-ethylhexyl acrylate, 5.0 parts of divinylbenzene, 7.5 parts of acrylic acid, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours. After cooling, 4.7 parts of 25% aqueous ammonia was added. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 53.1%, pH 8.9 and 190 mPa·s, respectively.

Example 2

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 240.0 parts of styrene, 189.2 parts of 2-ethylhexyl acrylate, 5.0 parts of trimethylolpropane trimethacrylate, 7.5 parts of acrylic acid, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours. After cooling, 4.7 parts of 25% aqueous ammonia was added. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 53.1%, pH 8.8 and 200 mPa·s, respectively.

Example 3

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 240.0 parts of styrene, 189.2 parts of 2-ethylhexyl acrylate, 5.0 parts of trimethylolpropane trimethacrylate, 7.5 parts of acrylic acid, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours. After cooling, 4.7 parts of 25% aqueous ammonia was added. Thereafter, 7.3 parts of Bacote 20T2 (trademark, a zirconia dispersion containing 20% $ZrO_2$, product of Nippon Shokubai Co.) was added, followed by stirring for 30 minutes. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 52.9%, pH 8.6 and 110 mPa·s, respectively.

Example 4

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 240.0 parts of styrene, 189.2 parts of 2-ethylhexyl acrylate, 5.0 parts of trimethylolpropane trimethacrylate, 7.5 parts of acrylic acid, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours. After cooling, 4.7 parts of 25% aqueous ammonia was added. Thereafter, 3.7 parts of Bacote 20T2 (trademark, a zirconia dispersion containing 20% $ZrO_2$, product of Nippon Shokubai Co.) was added, followed by stirring for 30 minutes. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 52.9%, pH 8.9 and 120 mPa·s, respectively.

Example 5

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 240.0 parts of styrene, 189.2 parts of 2-ethylhexyl acrylate, 5.0 parts of trimethylolpropane trimethacrylate, 7.5 parts of acrylic acid, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours. After cooling, 4.7 parts of 25% aqueous ammonia was added. Thereafter, 2.4 parts of Bacote 20T2 (trademark, a zirconia dispersion containing 20% $ZrO_2$, product of Nippon Shokubai Co.) was added, followed by stirring for 30 minutes. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 52.7%, pH 8.5 and 100 mPa·s, respectively.

Example 6

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 242.5 parts of styrene, 189.2 parts of 2-ethylhexyl acrylate, 2.5 parts of trimethylolpropane trimethacrylate, 7.5 parts of acrylic acid, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours. After cooling, 4.7 parts of 25% aqueous ammonia was added. Thereafter, 7.3 parts of Bacote 20T2 (trademark, a zirconia dispersion containing 20% $ZrO_2$, product of Nippon Shokubai Co.) was added, followed by stirring for 30 minutes. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 53.1%, pH 8.8 and 190 mPa·s, respectively.

Example 7

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 242.5 parts of styrene, 189.2 parts of 2-ethylhexyl acrylate, 2.5 parts of trimethylolpropane trimethacrylate, 7.5 parts of acrylic acid, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours and cooled. Then, a mixture of 4.8 parts of deionized water and 9.3 parts of dimethylethanolamine was added. Thereafter, 7.3 parts of Bacote 20T2 (trademark, a zirconia dispersion containing 20% $ZrO_2$, product of Nippon Shokubai Co.) was added, followed by stirring for 30 minutes. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 52.5%, pH 8.7 and 210 mPa·s, respectively.

Example 8

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 242.5 parts of styrene, 189.2 parts of 2-ethylhexyl acrylate, 2.5 parts of trimethylolpropane trimethacrylate, 7.5 parts of acrylic acid, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours and cooled. Then, a mixture of 3.1 parts of deionized water and 11.0 parts of diethanolamine was added. Thereafter, 7.3 parts of Bacote 20T2 (trademark, a zirconia dispersion containing 20% $ZrO_2$, product of Nippon Shokubai Co.) was added, followed by stirring for 30 minutes. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 52.5%, pH 8.5 and 230 mPa·s, respectively.

Example 9

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 242.5 parts of styrene, 189.2 parts of 2-ethylhexyl acrylate, 2.5 parts of trimethylolpropane trimethacrylate, 7.5 parts of acrylic acid, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours and cooled. Then, a mixture of 4.8 parts of deionized water and 9.3 parts of dimethylethanolamine was added. Thereafter, 5.0 parts of WS-600 (trademark, oxazoline group-containing aqueous solution, product of Nippon Shokubai Co.) was added and the mixture was stirred for 30 minutes. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 52.6%, pH 9.0 and 135 mPa·s, respectively.

Example 10

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 242.5 parts of styrene, 189.2 parts of 2-ethylhexyl acrylate, 2.5 parts of trimethylolpropane trimethacrylate, 7.5 parts of acrylic acid, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours and cooled. Then, a mixture of 4.8 parts of deionized water and 9.3 parts of dimethylethanolamine was added. Thereafter, 7.3 parts of K-2030 (trademark, oxazoline group-containing emulsion, product of Nippon Shokubai Co.) was added and the mixture was stirred for 30 minutes. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 52.4%, pH 8.4 and 175 mPa·s, respectively.

Example 11

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 242.5 parts of styrene, 189.2 parts of 2-ethylhexyl acrylate, 2.5 parts of glycidyl methacrylate, 7.5 parts of acrylic acid, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours and cooled. Then, a mixture of 4.8 parts of deionized water and 9.3 parts of dimethylethanolamine was added. Thereafter, 7.3 parts of Bacote 20T2 (trademark, a zirconia dispersion containing 20% $ZrO_2$, product of Nippon Shokubai Co.) was added, followed by stirring for 30 minutes. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 52.9%, pH 8.6 and 155 mPa·s, respectively.

Example 12

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 242.5 parts of styrene, 189.2 parts of 2-ethylhexyl acrylate, 2.5 parts of trimethylolpropane trimethacrylate, 7.5 parts of acrylic acid, 1.0 part of t-dodecylmercaptan, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours and cooled. Then, a mixture of 4.8 parts of deionized water and 9.3 parts of dimethylethanolamine was added. Thereafter, 7.3 parts of Bacote 20T2 (trademark, a zirconia dispersion containing 20% $ZrO_2$, product of Nippon Shokubai Co.) was added, followed by stirring for 30 minutes. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 52.9%, pH 9.0 and 200 mPa·s, respectively.

Example 13

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 242.5 parts of styrene, 189.2 parts of 2-ethylhexyl acrylate, 2.5 parts of trimethylolpropane trimethacrylate, 7.5 parts of acrylic acid, 1.0 part of t-dodecylmercaptan, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours and cooled. Then, a mixture of 4.8 parts of deionized water and 9.3 parts of dimethylethanolamine was added. Thereafter, 3.7 parts of Bacote 20T2 (trademark, a zirconia dispersion containing 20% $ZrO_2$, product of Nippon Shokubai Co.) was added and the mixture was stirred for 30 minutes. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 52.8%, pH 9.0 and 180 mPa·s, respectively.

Example 14

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 295.8 parts of styrene, 189.2 parts of 2-ethylhexyl acrylate, 2.5 parts of trimethylolpropane trimethacrylate, 5.0 parts of acrylic acid, 1.0 part of t-dodecylmercaptan, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours and cooled. Then, a mixture of 4.8 parts of deionized water and 9.3 parts of dimethylethanolamine was added. Thereafter, 7.3 parts of Bacote 20T2 (trademark, a zirconia dispersion containing 20% $ZrO_2$, product of Nippon Shokubai Co.) was added and the mixture was stirred for 30 minutes. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 52.9%, pH 9.0 and 200 mPa·s, respectively.

Comparative Example 1

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 245.0 parts of styrene, 189.2 parts of 2-ethylhexyl acrylate, 5.0 parts of glycidyl methacrylate, 7.5 parts of acrylic acid, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours. After cooling, 4.7 parts of 25% aqueous ammonia was added. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 53.0%, pH 8.6 and 150 mPa·s, respectively.

Comparative Example 2

A separable flask equipped with a stirrer, reflux condenser, thermometer, nitrogen gas inlet pipe and dropping funnel was charged with 171.7 parts of deionized water. Then, under stirring in a nitrogen gas stream, the contents of the flask were heated to an internal temperature of 70° C. On the other hand, the dropping funnel was charged with a monomer emulsion composed of 53.3 parts of methyl methacrylate, 240.0 parts of styrene, 189.2 parts of 2-ethylhexyl acrylate, 10.0 parts of glycidyl methacrylate, 7.5 parts of acrylic acid, 20.0 parts of 25% aqueous solution of Nonipol 200 (trademark, a polyoxyethylene phenyl ether, product of Sanyo Chemical Industries Co.), 50.0 parts of 20% aqueous solution of Hitenol N-08 (trademark, a polyoxyethylene alkyl ether sulfate ester salt; product of Dai-Ichi Kogyo Seiyaku Co.) and 106.5 parts of deionized water. Then, with the separable flask being held at an internal temperature of 70° C., the above monomer emulsion was added uniformly dropwise over 3 hours. At the same time, 65.8 parts of 3.9% aqueous solution of potassium persulfate and 60 parts of 2% aqueous solution of sodium hydrogensulfite were added uniformly dropwise over 3 hours. After completion of dropwise addition, the reaction mixture was incubated for ripening at 76° C. for 3 hours. After cooling, 4.7 parts of 25% aqueous ammonia was added. The emulsion was cooled and taken out through a 100-mesh stainless steel filter screen, whereby an aqueous resin (copolymer emulsion) was obtained. The nonvolatile matter content, pH and viscosity of the aqueous resin thus obtained were 53.1%, pH 8.8 and 130 mpa·s, respectively.

The emulsions obtained in Examples 1 to 14 and Comparative Examples 1 and 2 were respectively subjected to the following evaluation tests. The results are shown in Table 1.

(Methods for Evaluation)

The copolymer emulsions obtained in Examples 1 to 14 and Comparative Examples 1 and 2 were respectively formulated as shown hereunder to prepare damper formulations. These damper formulations were found to have the properties indicated below.

Acrylic copolymer emulsion 148 parts

Calcium carbonate: NN#200 (trademark, product of Nitto Powder Industry Co.) 240 parts Additive: propylene glycol 19 parts Dispersant: Demol EP (trademark, product of Kao Corporation) 4.3 parts Thickener: Acryset WR-600 (trademark, product of Nippon Shokubai Co.) 7 parts Antifoaming agent: Nopco 8034L (trademark, product of Sun Nopco Co.) 0.3 part (1) Thermal Drying Test Steel panels (trademark;SPCC-SD, 75 mm wide×150 mm long×0.8 mm thick, product of Nippon Test Panel Co.) were coated with the above-prepared damper formulations in coating thicknesses of 1.5 mm, 3.0 mm and 4.5 mm, respectively. Then, using a hot-air dryer, the coatings were dried at 150° C. for 30 minutes and the resulting dry films were evaluated for blistering (swelling) and cracking according to the following criteria.

Evaluation Criteria (Visual Evaluation)
○: Neither blistering nor cracking
Δ: Few blisters and cracks
X: Many blisters and cracks (2) Loss Factor (tan δ)

Steel panels (trademark;SPCC-SD, 15 mm wide×250 mm long×0.8 mm thick, product of Nippon Test Panel Co.) were coated with the above-prepared damper formulations. Then, using a hot-air dryer, the coatings were dried at 150° C. for 30 minutes. The coating amount was adjusted so that the thicknesses (dry thickness) of the damper formulation would be 1.5 mm, 3.0 mm or 4.5 mm. The vibration damping properties was evaluated by measuring tan δ by the cantilever method in a measuring environment of 25° C. using Ono Instrument's loss factor determination system. Thus, the larger the loss factor value is, the more satisfactory is the vibration damping properties.

TABLE 1

| | | Examples | | | | | | | | | | | | | | Co. Examples | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 1 | 2 |
| Thermal drying characteristics | 1.5 mm | ○ | ○ | ⊙ | ⊙ | ⊙ | ⊙ | ⊙ | ⊙ | ⊙ | ⊙ | ⊙ | ⊙ | ⊙ | ⊙ | ○ | ○ |
| | 3.0 mm | ○ | ○ | ⊙ | ⊙ | ○ | ○ | ⊙ | ⊙ | ○ | ○ | ○ | ⊙ | ⊙ | ⊙ | X | X |
| | 4.5 mm | ○ | ○ | ○ | ○ | ○ | ○ | ○ | ○ | ○ | ○ | ○ | ○ | ○ | ⊙ | X | X |
| Loss factor (tan δ) | 1.5 mm | 0.1 | 0.11 | 0.16 | 0.12 | 0.1 | 0.16 | 0.18 | 0.19 | 0.14 | 0.13 | 0.14 | 0.2 | 0.19 | 0.2 | 0.06 | 0.08 |
| | 3.0 mm | 0.24 | 0.25 | 0.32 | 0.31 | 0.26 | 0.27 | 0.32 | 0.33 | 0.23 | 0.26 | 0.3 | 0.33 | 0.32 | 0.35 | Not measurable owing to blistering | Not measurable owing to cracking |
| | 4.5 mm | 0.35 | 0.36 | 0.43 | 0.42 | 0.37 | 0.38 | 0.46 | 0.48 | 0.29 | 0.3 | 0.4 | 0.47 | 0.47 | 0.49 | Not measurable owing to blistering | Not measurable owing to blistering |

The invention claimed is:

1. An emulsion composition for vibration damping materials
    which comprises (i) an emulsion obtained by polymerizing a monomer composition containing an unsaturated carboxylic acid monomer as an essential component and (ii) a crosslinking agent,
    wherein said monomer composition contains 0.1 to 20 mass % of an ethylenically unsaturated carboxylic acid monomer and 99.9 to 80 mass % of other copolymerizable ethylenically unsaturated monomer,
    said crosslinking agent is at least one oxazoline compound, and is used in the form of an aqueous dispersion with the aid of an emulsifier,
    wherein the emulsion has a glass transition temperature of −50 to 40° C.,
    and loss factor (loss tangent: tan δ) of a damper formulation formulated by the emulsion composition for vibration damping materials is not less than 0.15.

2. A damper formulation which comprises the emulsion composition for vibration damping materials according to claim 1.

3. The damper formulation according to claim 2, which comprises a polyvalent metal oxide.

4. Method of coating the damper formulation according to claim 2, wherein the damper formulation is coated and dried in such a way that the dry thickness of a coating is 1.5 to 5.0 mm.

5. A vibration damping material obtained by the method of coating according to claim 4.

6. Method of coating the damper formulation according to claim 3, wherein the damper formulation is coated and dried in such a way that the dry thickness of a coating is 1.5 to 5.0 mm.

7. A vibration damping material obtained by the method of coating according to claim 6.

* * * * *